United States Patent
Okulov

[11] Patent Number: 5,969,620
[45] Date of Patent: Oct. 19, 1999

[54] WATER LEVEL ALARM

[76] Inventor: Pavel D. Okulov, 365 10th Ave. #9, Lachine, Canada, H8S 3E4

[21] Appl. No.: 09/121,912
[22] Filed: Jul. 24, 1998
[51] Int. Cl.⁶ ................................................ G08B 21/00
[52] U.S. Cl. ........................... 340/620; 340/618; 73/290; 73/304 R; 47/40.5
[58] Field of Search ................... 340/618, 620; 47/40.5; 73/290 R, 304 R

[56] References Cited

U.S. PATENT DOCUMENTS

| | | | |
|---|---|---|---|
| 4,652,811 | 3/1987 | Kwiat et al. | 324/65 R |
| 4,796,017 | 1/1989 | Merenda | 340/620 |
| 4,850,386 | 7/1989 | Bireley | 137/78.3 |
| 4,931,775 | 6/1990 | Sheriff | 340/604 |
| 5,408,223 | 4/1995 | Guillemot | 340/620 |
| 5,410,839 | 5/1995 | Granger | 47/40.5 |
| 5,428,348 | 6/1995 | Gault | 340/618 |
| 5,450,067 | 9/1995 | Wang | 340/620 |
| 5,493,277 | 2/1996 | Pierce et al. | 340/620 |
| 5,552,774 | 9/1996 | Gridley | 340/623 |
| 5,835,018 | 11/1998 | Kursel et al. | 340/620 |
| 5,867,929 | 2/1999 | Jung et al. | 47/40.5 |

Primary Examiner—Jeffery A. Hofsass
Assistant Examiner—Julie B. Lieu
Attorney, Agent, or Firm—Paul Sharpe; Marks & Clerk

[57] ABSTRACT

A DC powered water/moisture monitor suitable for use in combination with a Christmas tree stand to detect a low water/moisture level is provided. The alarm device set forth has application in many other fields including farmland moisture monitoring, house plant, soil moisture monitoring, water tank level monitoring inter alia. The device includes an alarm, a casing, electronic circuitry and sensors/probes/electrodes for detecting moisture/water. The unit is an integral unit and combines all of these features in a one-piece waterproof assembly. The arrangement is, therefore, portable and can be readily employed in a variety of different environments.

14 Claims, 7 Drawing Sheets

WATER LEVEL ALARM

FIELD OF THE INVENTION

The invention generally relates to devices for detecting fluid levels and indicating when a fluid level is above or below a given point and more particularly, the present invention relates to a device for detecting a low water level or low humidity level in soil and elsewhere.

BACKGROUND OF THE INVENTION

Fluid and humidity moisture sensors are well known in the prior art. For example, humidity sensors are frequently used to determine the moisture level of plant soil. Such humidity sensors usually have two metal prongs for insertion into the soil as set forth in U.S. Pat. No. 4,850,386 issued to Bireley, Jul. 25, 1989 and in U.S. Pat. No. 4,931,775 issued to Sheriff, Jun. 5, 1990. The prongs are usually inserted into a plant base so that the soil humidity can be measured between the prongs. Such devices are not applicable or useful in measuring of water level in, for example, a Christmas tree stand or other water tanks as well as in detecting of presence (or absence) of water in different household areas.

In the case of a Christmas tree or any other fresh cut plants, it is quite important to keep the level of water above the cut area of the plant so that the cut is not exposed to air. Upon exposure, the pores and vascular system of the plant draw in air instead of water. In the case where the air fills the vascular system to a certain height, a plant may lose the capacity to transport water to other areas of the plant which leads to the eventual death of the plant.

With respect to other advancements in the art, many devices have been provided with audio or visual indicators for indicating to a user the need for additional moisture/water. In particular, arrangements for Christmas tree moisture content have been proposed in, for example, U.S. Pat. Nos. 4,796,017, 5,410,839, 5,428,348 and 5,493,277. The apparatus discussed in these references teach complicated arrangements, some of which isolate the battery and the alarm or require a switch, etc.

The present invention avoids the complicated arrangements in the art to provide a simplified integral unit capable of being used in a number of different ways.

SUMMARY OF THE INVENTION

One object of the present invention is to provide an improved water/moisture detector.

A further object of one embodiment of the present invention is to provide a self-contained low moisture level indicator, comprising:

a hollow housing having a first end and a closed second end;

a first moisture sensing means on the housing and adjacent the first end for sensing moisture;

a second moisture sensing means on the housing and in spaced relation to the first moisture sensing means, the second moisture sensing means adjacent the closed second end;

alarm means sealed into the housing at the first end for indicating moisture deficiency at a predetermined level;

electronic circuitry within the housing connecting the first moisture sensing means and the second moisture sensing means and the alarm means, the circuitry including comparison circuitry for comparison of signals between each sensing means; and a power supply mounted within the housing for supplying a source of power to the electronic circuitry.

In one possible application, the indicator may be used to provide a low water level alarm for a Christmas tree stand.

Advantageously, the arrangement is entirely self-contained with no extraneous or ancillary alarms, power supplies, cords or other encumbrances. This allows the unit to be used in almost any location such as in a bathroom, directly in a liquid container, submersed or implanted directly into the soil of a plant, garden inter alia.

A further object of the present invention is to provide an integral and self-contained low moisture level alarm, comprising:

a hollow nonconductive housing having a first end and a closed second end;

a first moisture sensing electrode on the housing and adjacent the first end for sensing moisture;

a second moisture sensing electrode on the housing and in spaced relation to the first moisture sensing electrode, the second moisture sensing electrode adjacent the closed second end;

a third electrode common to the first moisture sensing electrode and the second moisture sensing electrode;

alarm means sealed into the housing at the first end for indicating moisture deficiency at a predetermined level;

electronic circuitry within the housing connecting the first moisture sensing electrode and the second moisture sensing electrode and the alarm means, the circuitry including logic means for comparison of signals between each sensing means, the logic means for activating the alarm means when the first moisture sensing electrode is not in contact with moisture; and a power supply mounted within the housing for supplying a source of power to the electronic circuitry.

As a convenience, the unit is inexpensive, waterproof and not susceptible to shorting due to the positioning of the electrodes acting as the sensors. As an attendant feature of the device, the same may be linked to a conventional security/alarm system over a large or small area. Since no power switch or other peripheral devices are required for optimal performance, the device may be employed as a lawn moisture detector or in farmland applications.

Having thus described the invention, reference will now be made to the accompanying drawings illustrating preferred embodiments.

BRIEF DESCRIPTION OF THE DRAWINGS

Similar numerals used in the text denote similar elements

DETAILED DESCRIPTION OF THE PREFERRED EMBODIMENTS

Figure 1:
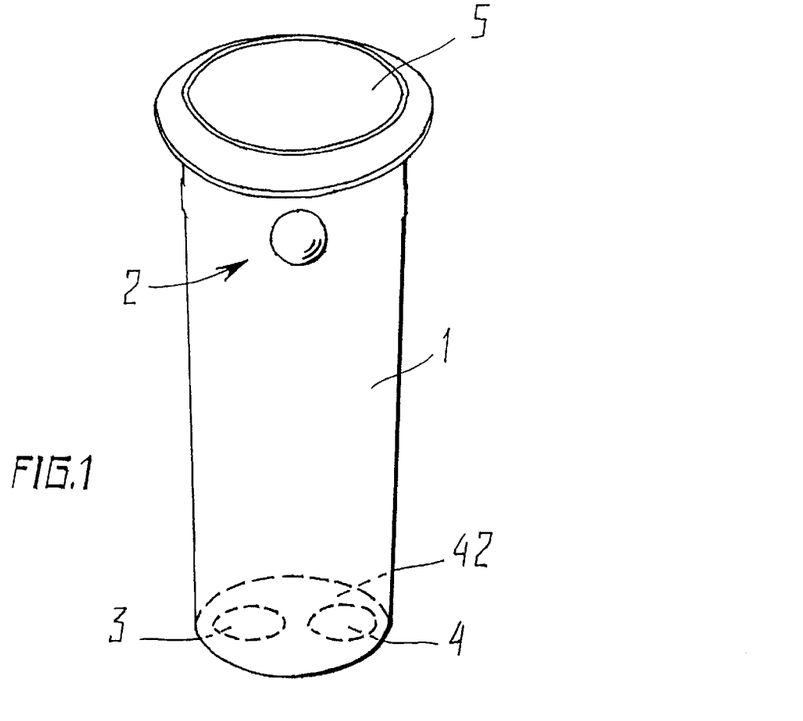
FIG. 1 illustrates a perspective view of one embodiment of the present invention.

Referring to FIG. 1, one embodiment of the present invention is shown in perspective, where the device comprises a tubular plastic housing 1 generally in the shape of a cylinder. The housing includes a first moisture sensing upper electrode 2 and a second moisture sensing lower electrode 3. A common electrode 4 is also provided. The bottom of the device positions the electrodes 3 and 4 in spaced relation, while electrode 2 is adjacent the top of the device as illustrated. A transducer 5 is positioned at the top of the device as illustrated. The housing 1 has a plurality of annular grooves 41 adjacent the top of the device and below electrode 2. The grooves interrupt traces of water (droplets) on the peripheral surface of the housing. The entire arrangement is waterproof facilitating use of the device in applications where it is submersed in water or implanted in earth formations, etc. The electrodes 2, 3 and 4 are also referred to as sensors or probes with respect to different embodiments discussed hereinafter.

Figure 2:
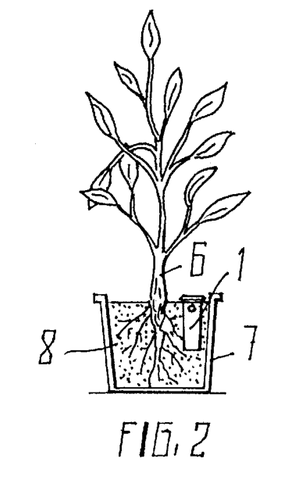
FIG. 2 is a view of the device in situ according to one application.
Figure 3:
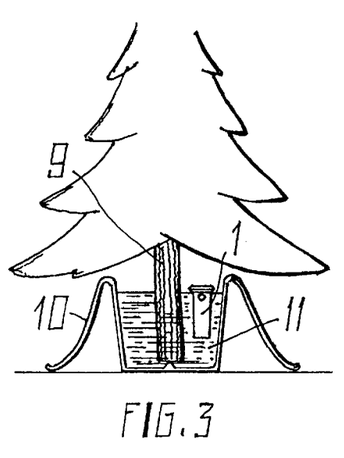
FIG. 3 is a view of the device in situ according to a second application.
Figure 4:
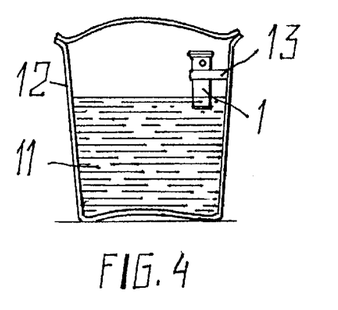
FIG. 4 is a view of the device in situ according to a third application.

With reference to FIGS. 2, 3 and 4, shown are views of the device in situ. In the examples, the device may be implanted within soil 8 of plant 6 in a pot 7. In this disposition, the top of the device, which may be a transducer, is exposed to the air, which makes delivery of audio signal easier. In FIG. 3, the device may simply float in water 11 of Christmas tree base 10. FIG. 4 illustrates the device in a water tank 12. The device may be attached to tank 12 by a holder 13.

Figure 5:
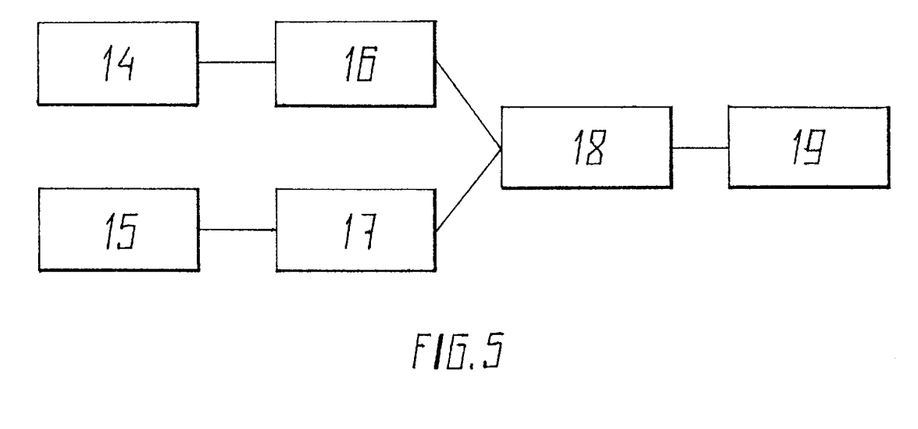
FIG. 5 is a block diagram schematic of a circuit according to one embodiment of the present invention.

FIG. 5 schematically illustrates a block diagram showing the electrical components employed in the device. The device includes upper sensing means 14, lower sensing means 15 which determine the presence of water or moisture in the soil. The sensing means can employ any known apparatus such as resistive probes, capacitive, inductive, electromagnetic or acoustic arrangements well known to those skilled in the art. Outputs of these devices are connected with a first trigger 16 and a second trigger 17 which are determined to produce a logic output signal upon sensors 14 and 15 to generate predetermined or preset levels of signals corresponding to the presence of water or moisture. These triggering levels, can be fixed or adjusted to the different modes of use as discussed with respect to FIGS. 2 through 4 of present invention. Logic means 18 produces an output signal enabling alarm 19 in accordance with the logic table 1.

TABLE 1

LOGIC STATES

| UPPER SENSOR | LOWER SENSOR | ALARM STATUS |
| --- | --- | --- |
| IN | IN | DISABLED |
| OUT | IN | ENABLED |
| OUT | OUT | DISABLED |
| IN* | OUT* | PROGRAMMABLE* |

Figure 6:
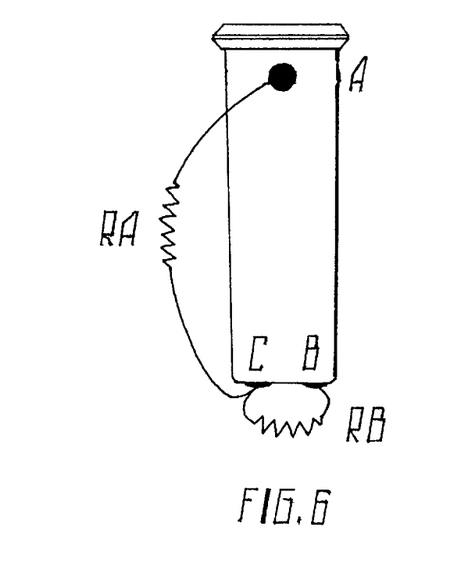
FIG. 6 is a schematic illustration of the device and probe resistance relationships.

* - Denotes an optional parameter
In - Denotes that the sensor is in water or exposed to high levels of humidity
Out - Denotes that the sensor is out of contact with water or in low levels of humidity The simplest sensing means can employ resistive sensors with electrode probes as shown in FIG. 6. Table 2 illustrates the status of electrode probes for different conditions associated with water or soil.

TABLE 2

| SITUATION | STATUS OF ELECTRODES | ALARM STATUS |
| --- | --- | --- |
| 1 | RA > Rtr; RB > Rtr | Off (Disable) |
| 2 | RA ≤ Rtr; RB ≤ Rtr | Off (Disable) |
| 3 | RA > Rtr; RB ≤ Rtr | ON (Enable) |

A - Upper Sensor (electrode)
B - Lower Sensor (electrode)
C - Common Electrode
Rtr - Resistance of Triggering In situation 1, neither of the sensing electrodes 20 or 21 contacts any moisture and, therefore, the alarm is disabled as set forth in the table. In a second situation, both electrodes/sensors 20 and 21 are both in contact with moisture, therefore, the alarm is disabled. In a third situation, sensor 20 is out of contact with moisture while sensor 21 is in contact with moisture/water. In this situation, the alarm would be enabled and activated since the difference in the resistance would be sufficient to trigger the alarm. The other resistance relationships between the sensors are set forth in the table.

Figure 7:
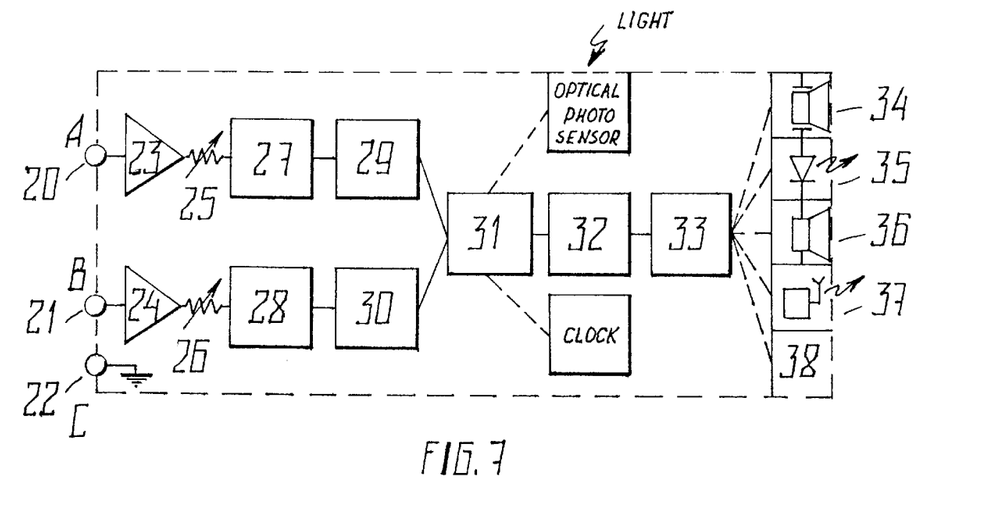
FIG. 7 is a block diagram schematic of the circuit employing different features of one embodiment of the present invention.

A more detailed block diagram employing the electrode probes is shown in FIG. 7. Upper probe 20 provides signal conforming resistance between probe 20 and common probe 22. This signal is amplified by an amplifier 23, and regulated by resistor 25. The signal then goes to trigger 27 which, in combination with resistor 25, produces signal shaped by logic output former 29. Status "1" indicates condition "IN" and status "0" indicates condition "OUT". Lower probe 21 provides signal conforming resistance between probe 21 and common probe 22. After passing amplifier 24, resistor 26, trigger 28 and logic output former 30, the signal appears as "1" or "0" indicating condition "IN" or "OUT" for the lower probe 21. Logic 31 includes, for example, an exclusive OR gate which can provide output in accordance with Table 1. Basically, this output can operate an oscillator or melody synthesizer 32 which, in combination with amplifier 33 and Piezo vibrating plate 34 (Piezo speaker) or light emitting diode 35 or speaker 36 or radio/(magnetic field)/acoustic transmitter 37 or any other device or combinations thereof, provides an alarm.

Figure 8:
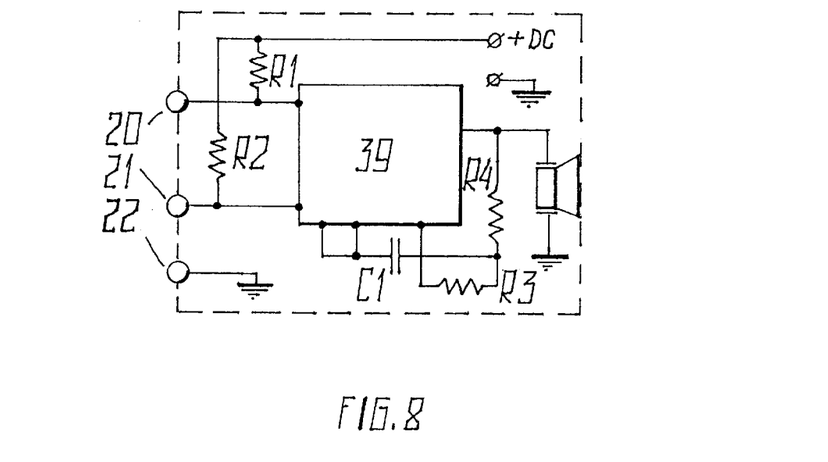
FIG. 8 illustrates electronic schematic made in accordance with one embodiment of the present invention.
Figure 9:
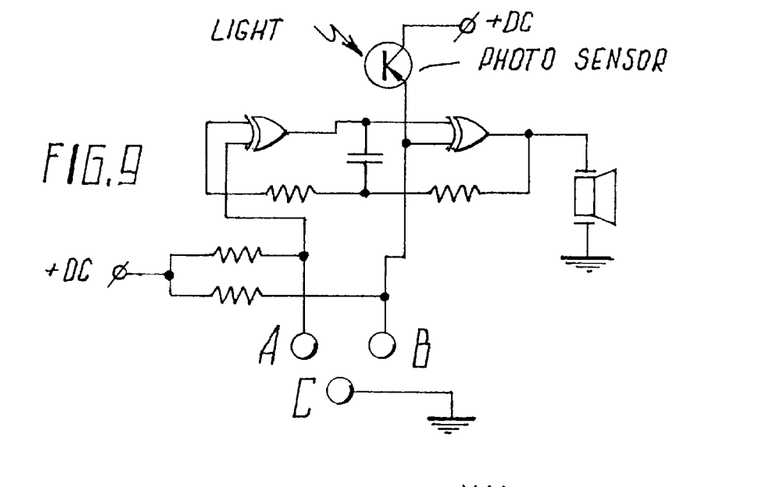
FIG. 9 is a schematic illustration of one embodiment of the present invention employing two exclusive OR gates and optional optical photo sensor.
Figure 10:
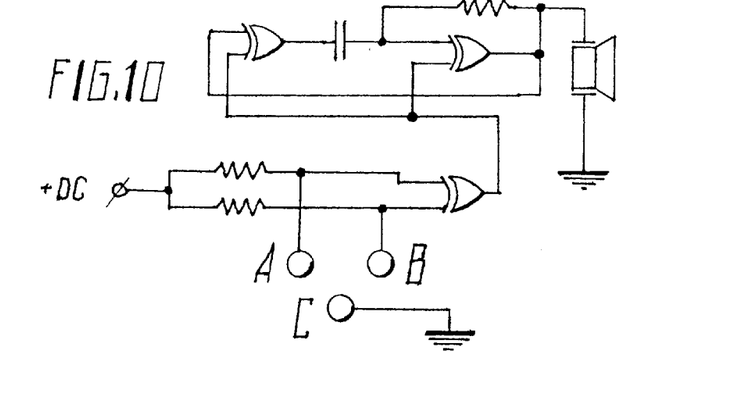
FIG. 10 is a schematic illustration of one embodiment of the present invention employing three exclusive OR gates.
Figure 11:
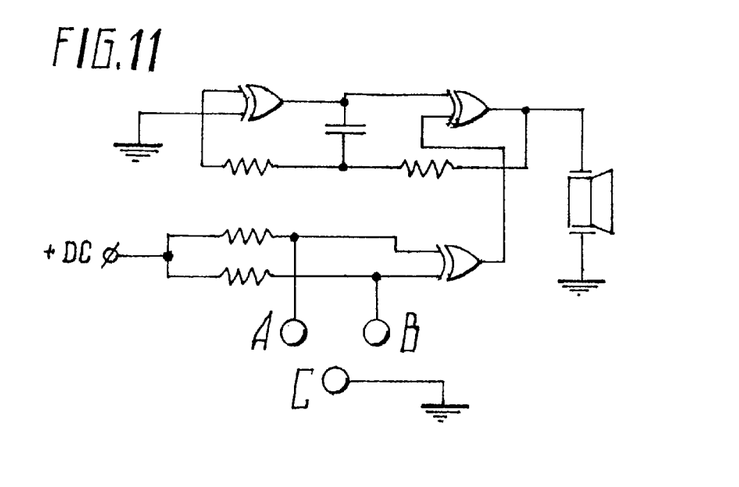
FIG. 11 is a variation of FIG. 10.

A more specific electronic diagram is shown in FIG. 8. Resistors, R1 and R2 determine the triggering level of the logic components of electronic chip 39, capacitor C1; resistors R3 and R4 determine an oscillating frequency about 1000 Hz and battery 30 consisting of button cells (not shown) which provide a voltage between 3 and 6 volts. With this voltage, direct output of chip 39 is enough to directly operate Piezo vibrating plate 34. One possibility for the circuit is shown in the schematic diagram employing two exclusive OR logic gates in FIG. 9. In the same figure, an optional photo sensor disabling alarm 60 is shown. Further variants employing three exclusive OR gates are shown in FIGS. 10 and 11.

Figure 12:
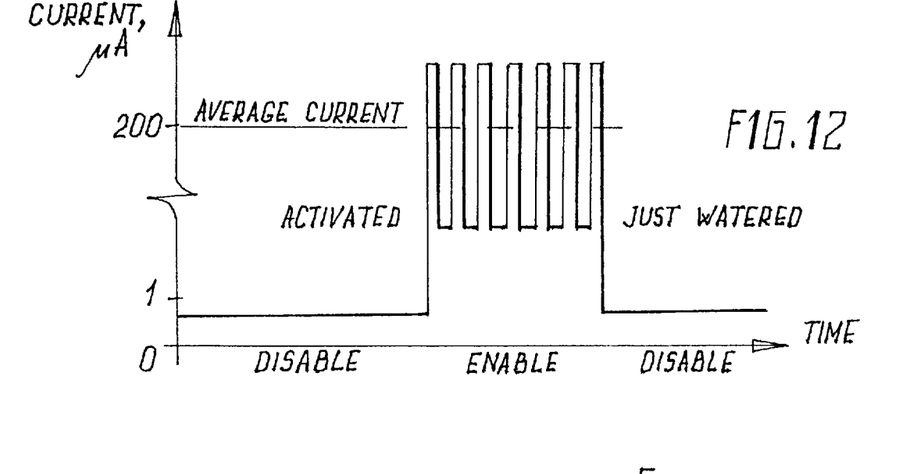
FIG. 12 is a graphical illustration of typical current drain during dormant and active states of the alarm.

In FIG. 12, a current drain during idle and active states of use of the device is shown. The device drains less than 1 microamp in an idle mode (storage, floating in water, wet soil, etc.) and about 200 microamp when alarm goes ON. Accordingly, with four cells for example, 1.5V (60 mA*hour), the device can provide more than 1000 alarms at 0.25 hours each. It is an estimation that approximately 3–5 years life of such a device can be expected.

Figure 13:
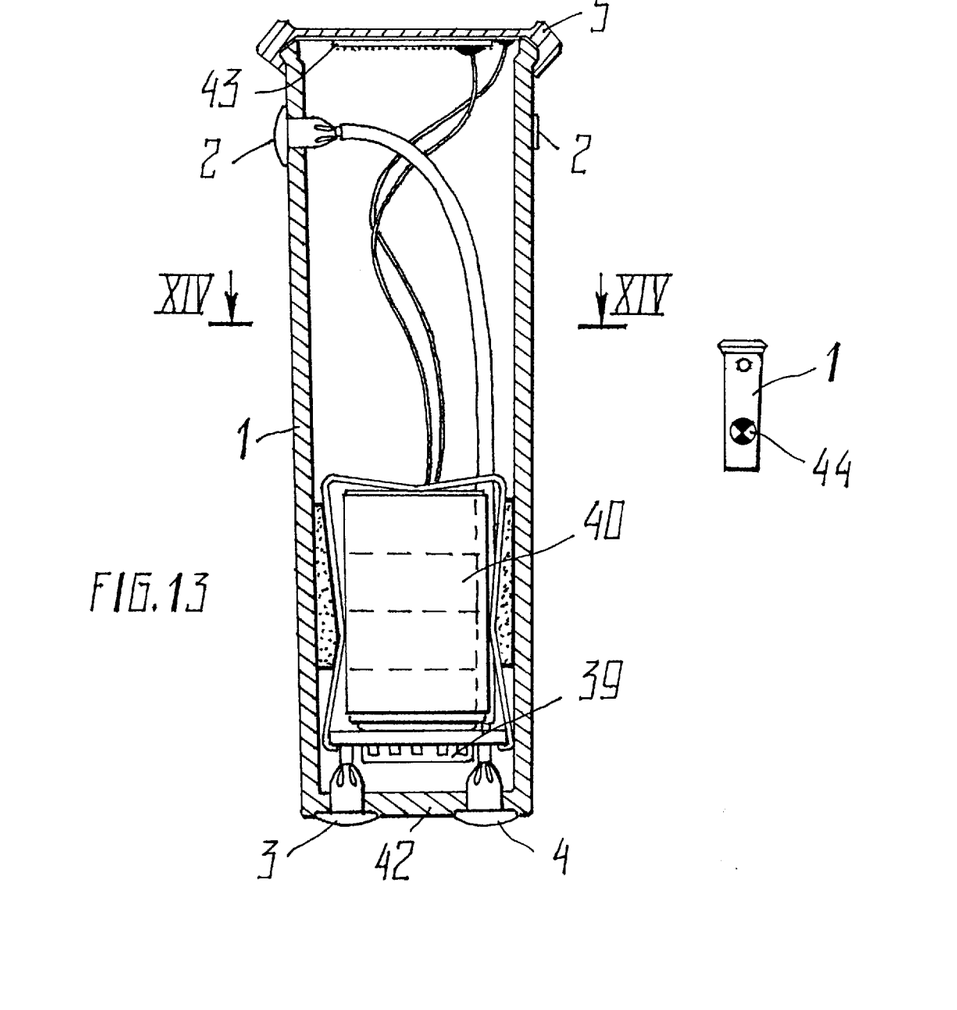
FIG. 13 is a cross-section of the device of FIG. 1.
Figure 14:
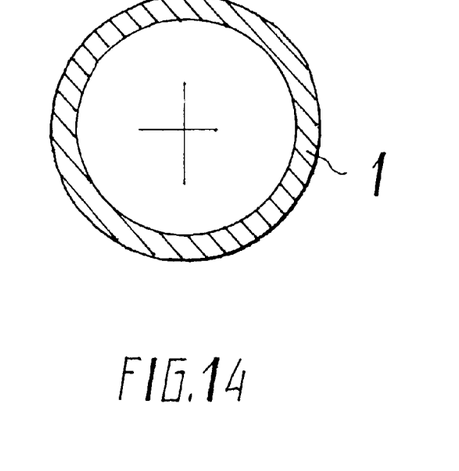
FIG. 14 is a sectional view along line 13—13.

FIG. 13 illustrates a longitudinal cross-section of an embodiment where Piezo vibrating plate 5 is covered by isolating film 43 which also can be used for applying text or graphic information. Electrodes 2, 3, 4, preferably made from stainless steel, are hermetically sealed in housing and bottom 42. Battery pack 40 and chip 39 are placed close to the bottom part of housing 1 which results in the center of gravity 44 of the unit being closer to the bottom of the device. This is important in applications where the device floats since the lower center of gravity affords greater stability of the device. FIG. 14 shows tubular cross-section of the housing 1.

Figure 15:
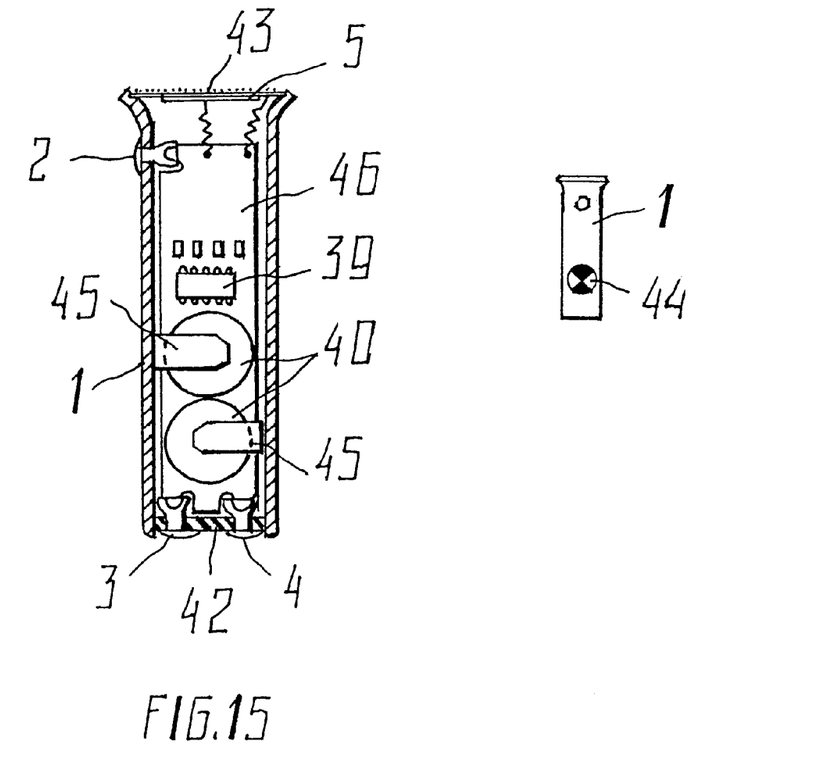
FIG. 15 is a view similar to FIG. 14 employing a printed circuit board.

An example of an embodiment employing a printed circuit is shown in FIG. 15. Button cells 40 are clamped to the printed circuit board by spring-like members 45. Logic chip 39 and the remaining components are surface mounted in order to reduce the weight of the device. It is important to note that the weight of the device should be in accordance with volume of the housing, so, for example, the floating device will have electrode 2 covered by water. Upon contact with the bottom of the water tank, the level of water drops relative to housing 1, thus exposing electrode 2 to the air. Due to the fact that usually housing 1, being in water for a prolonged time, absorbs some water (which makes clearing water traces off the housing difficult), there are annular grooves 41 between electrode 2 and common electrode which interrupt traces of water on the surface of housing 1 and, therefore, reduce resistance between electrode 2 and common electrode. This also prevents shorting.

Figure 16:
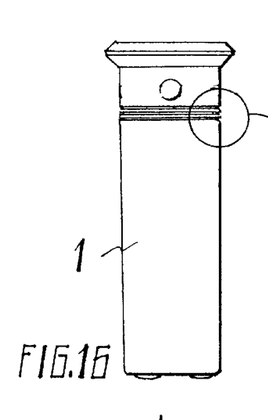
FIG. 16 is an elevational view of the device.
Figures 16A, 17:
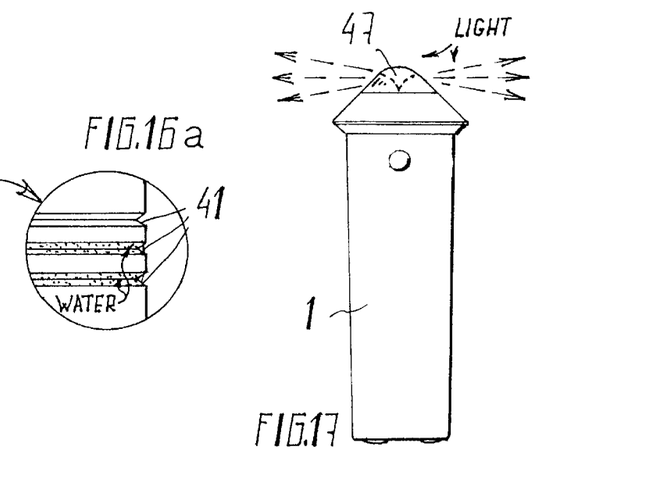
FIG. 16a is an enlarged view of grooves on the apparatus.
FIG. 17 is a view similar to FIG. 16 illustrating a light emitting source as an alarming means.

FIG. 16 illustrates an embodiment employing a light emitting device, for instance LED 47 as a source of alarm. The same configuration can be used for incorporating of optical (light) photo sensor (FIG. 17), which can disable alarm during the night and activate it again when lights in the room are ON or during daylight.

Figure 18:
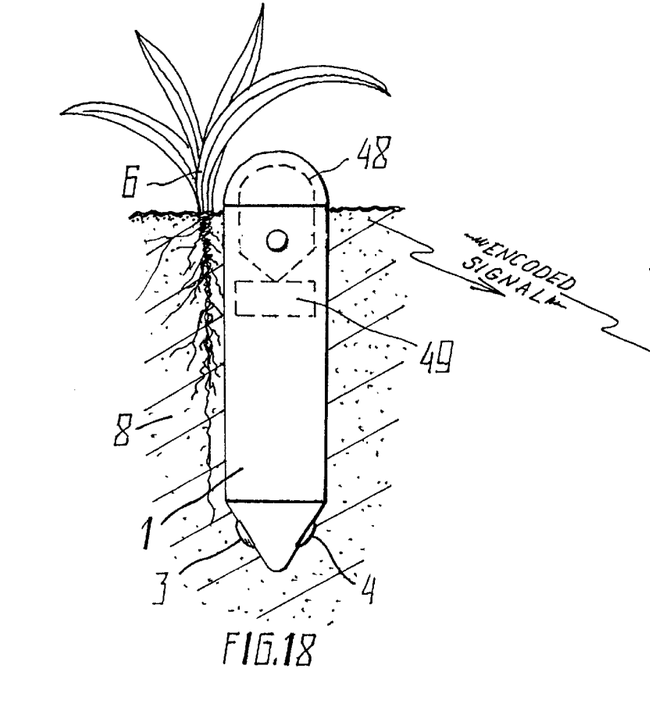
FIG. 18 is an elevational view of a further embodiment of the present invention.
Figure 19:
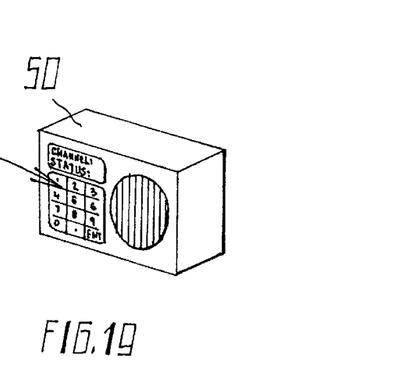
FIG. 19 illustrates a further embodiment of the present invention.

In order to remotely monitor watering needs of plants or tank water level, or monitor several devices simultaneously an option of incorporating a transmitting means 49 is possible, as generally illustrated in FIG. 18. It is possible to use radio transmitter, for example, similar to those used for garage door openers or remote locks in order to transmit alarm status to the remote monitor 50 (FIG. 19). The remote monitor 50 can have any possible means for alarming as well as any combination of those, including light, sound, telephone activation, etc., devices and/or optical sensor for disabling the monitor during the night. Another possibility of disabling the device during inconvenient hours is the incorporation of a timer or a preset clock.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A self-contained low moisture level alarm, comprising:

a hollow housing having a first end and a closed second end;

a first moisture sensing means on said housing and adjacent said first end for sensing moisture;

a second moisture sensing means on said housing and in spaced relation to said first moisture sensing means, said second moisture sensing means adjacent said closed second end;

alarm means sealed into said housing at said first end for indicating moisture deficiency at a predetermined level;

electronic circuitry within said housing connecting said first moisture sensing means and said second moisture sensing means and said alarm means, said circuitry including comparison circuitry for comparison of signals between each sensing means; and a power supply mounted within said housing for supplying a source of power to said electronic circuitry.

2. The alarm as set forth in claim 1, wherein said sensing means comprise electrodes.

3. The sensing means as set forth in claim 2, wherein said alarm includes a third common electrode.

4. The alarm as set forth in claim 1, wherein said alarm is waterproof.

5. The alarm as set forth in claim 4, wherein said alarm means is selected from the group comprising: audible alarm means, sonic alarm means and visual alarm means.

6. The alarm as set forth in claim 3, wherein housing is nonconductive.

7. The alarm as set forth in claim 1, further including a plurality of grooves on said housing for receiving moisture or water droplets.

8. An integral and self-contained low moisture level alarm, comprising:

a hollow nonconductive housing having a first end and a closed second end;

a first moisture sensing electrode on said housing and adjacent said first end for sensing moisture;

a second moisture sensing electrode on said housing and in spaced relation to said first moisture sensing electrode, said second moisture sensing electrode adjacent said closed second end;

a third electrode common to said first moisture sensing electrode and said second moisture sensing electrode;

alarm means sealed into said housing at said first end for indicating moisture deficiency at a predetermined level;

electronic circuitry within said housing connecting said first moisture sensing electrode and said second moisture sensing electrode and said alarm means, said circuitry including logic means for comparison of signals between each sensing means, said logic means for activating said alarm means when said first moisture sensing electrode is not in contact with moisture; and a power supply mounted within said housing for supplying a source of power to said electronic circuitry.

9. The alarm as set forth in claim 8, wherein said housing comprises a cylinder, said second end including said second moisture sensing electrode and said third electrode in spaced relation.

10. The alarm as set forth in claim 8, wherein said alarm means comprises a transducer.

11. The alarm as set forth in claim 8, wherein said alarm means is selected from the group comprising: audible alarm means, sonic alarm means and visual alarm means.

12. The alarm as set forth in claim 8, further including a plurality of grooves on said housing for receiving moisture or water droplets.

13. The alarm as set forth in claim 8, wherein said alarm is submersible in water.

14. The alarm as set forth in claim 8, wherein said alarm is implantable in soil.

* * * * *